No. 813,718. PATENTED FEB. 27, 1906.
S. E. KNOWLES.
TROLLING SPOON.
APPLICATION FILED AUG. 26, 1904.
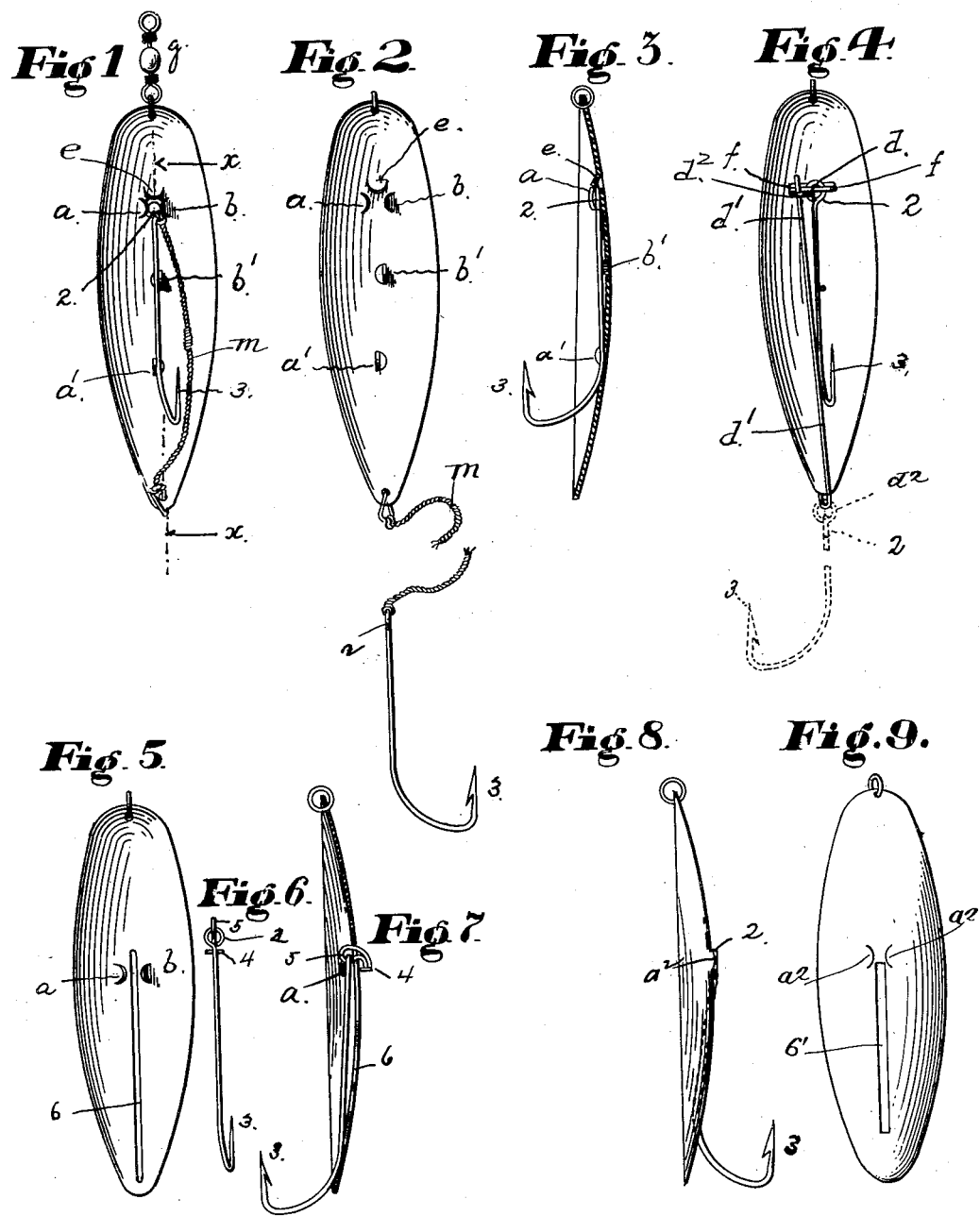

UNITED STATES PATENT OFFICE.

SAMUEL E. KNOWLES, OF SAN FRANCISCO, CALIFORNIA.

TROLLING-SPOON.

No. 813,718.

Specification of Letters Patent.

Patented Feb. 27, 1906.

Application filed August 26, 1904. Serial No. 222,244.

*To all whom it may concern:*

Be it known that I, SAMUEL E. KNOWLES, a citizen of the United States, residing in the city and county of San Francisco and State of California, have invented new and useful Improvements in Trolling-Spoons, of which the following is a specification.

This invention has for its object the production of an improved spoon-bait or trolling-spoon for fishing in which the hook is secured to and rigidly held on the spoon in the most effective position for catching and holding in the mouth of the fish when the spoon is taken, and at the same time the hook is readily detached by the efforts made by the fish to reject the spoon or by the strain thrown upon the line at the moment of striking the fish.

To such end and object the present invention consists chiefly in a novel construction of spoon having means for detachably fastening a hook in a rigid position thereon and means for loosely but permanently attaching the hook to the line, all as hereinafter more fully described and set forth.

The following description explains the manner in which I proceed to construct and apply the said invention in carrying out the same and securing the desired end and object, the accompanying drawings, forming a part of this specification, being referred to therein.

Figure 1 of the drawings is a front view of a spoon-bait embodying my invention, showing the hook rigidly but detachably fastened in position on the spoon and also permanently connected to the line by being attached to the lower end of the spoon. Fig. 2 represents the same parts after the hook has been detached from the spoon. Fig. 3 is a sectional view taken longitudinally through Fig. 1 on the line *x x*. Fig. 4 is a front view of a spoon on which the hook is permanently but loosely attached to the spoon by a stiff wire loop and a traveler instead of by the ordinary snell or cord. Figs. 5 and 6 illustrate another mode of attaching the hook to the spoon. Fig. 7 is a sectional view taken longitudinally through the spoon, Fig. 5, showing the hook fixed in position in the bowl or concave face by the means represented in Figs. 5 and 6. Fig. 8 is a side view of the same spoon with the hook fixed in position on the back or convex face. Fig. 9 is a view taken from the right side of the spoon shown in Fig. 8 with the hook omitted.

In this improvement the hook is temporarily fixed to the spoon with the barb standing in a plane at right angles, or substantially so, to the face of the spoon. The hook is also loosely but permanently connected with or to the line, so as to be attached thereto after it is detached or dislodged from its rigid position on the spoon. The hook is held rigidly on the spoon by several clips or projections standing out from the front face or concave side of the spoon, as seen in Figs. 1, 2, 3, and 5, when the hook is to occupy a position on that side of the spoon, or in another way the clips are located on the back face or convex side, as seen in Figs. 8 and 9, when the hook is fixed on the back of the spoon.

In the construction illustrated in Figs. 1, 2, and 3 the clips *a b* are located in the bowl on opposite sides of the longitudinal center line and at proper distance apart to grip and hold the eye or loop 2 on the shank when that part is inserted between the clips, and at intervals apart below the clips I provide projections *a'* *b'* on opposite sides of the same center line in such position that they will set against the shank of the hook, and thus prevent it from moving laterally when the hook is set in position. As the eye 2 stands at right angles to the barb 3, it will be seen that the latter will stand outward in a plane at right angles, or approximately so, to the spoon when the eye is introduced and pressed forward between the clips. This position can be modified simply by changing the angle of the eye with relation to the plane of the barb on the opposite end of the shank. The most effective position of the barb with reference to the spoon, however, is found to be one in which it stands outward and in a plane at right angles to the face of the spoon, as shown in the drawings. The clips *a b* and the projections *a' b'* are readily formed integrally with the spoon by cutting and bending up small lips, ears, or semicircular portions out of the metal; but these fastenings may also be separate pieces secured in place by soldering. An additional clip *e* placed on the center line just above the clips *a b* serves as a stop to limit the forward thrust of the eye 2 when setting the hook in position and will have the effect to prevent the eye from being forced through the clips *a b*, but the latter will hold the hook without requiring the additional clip *e* across the end.

In the modification illustrated in Fig. 4 a stiff wire loop *f*, standing across the longitudinal center line and clear of the surface of the spoon, will act in the same manner as the clips a b to receive and confine the eye 2 of the hook. This fastening when employed in place of the clip is secured by soldering the ends of the wire f to the face of the spoon.

In one way I connect the hook to the line by a cord or snell m, having one end attached to the hook and the other to the end of the spoon, as shown in Figs. 1 and 2, or as a substitute for the snell and where it may be found desirable to attach the hook more securely to the spoon than can be done by means of such a flexible fastening I provide a stiff wire loop d' on the spoon extending from the clips that take the eye of the hook down to the lower end of the bowl and then attach the hook to this loop by a traveler $d^2$, passed through the eye on the shank and sliding loosely on the loop. Fig. 4 illustrates this mode of connecting the hook to the spoon. The position of the hook when it is detached from the clips under the strain thrown on it by the fish is indicated by the dotted lines in Fig. 4.

In the modification illustrated in Figs. 5, 6, and 7 the traveler is composed of a stiff wire loop 5, fitted to slide loosely in along slot 6 in the spoon. The loop 5 being attached to the shank of the fish-hook by its eye 2 is prevented from pulling out of the slot by a head or button 4 on the end of the loop. This modification constitutes a simple substitute for the wire loop d', (illustrated in Fig. 4,) and in some respects it will be found a stronger construction than the wire loop and traveler illustrated in Fig. 4.

Figs. 8 and 9 illustrate a slight modification, in which the hook is temporarily attached to the back or convex side instead of to the concave side of the spoon. In this construction the clips $a^2$, that take the eye of the hook, are situated on the back of the spoon, and the hook is held in position by having its shank set in the slot 6', so that it cannot be dislodged and separated from the spoon except by a longitudinal strain or pulling force applied to the barbed end.

In all these different modes of permanently connecting the hook to the line through the spoon, however, the strain thrown upon the hook by the fish at the moment it takes the bait has the effect to detach the hook from the clips, and from the instant it is unfastened until it is arrested by the snell m or the long wire loop d' or the slot and traveler 5 6 the limited play or movement of the hook is sufficient to fix the hook in the mouth of the fish whether he rejects the spoon or not.

Having thus described my invention, what I claim, and desire to secure by Letters Patent, is—

1. A trolling-spoon, a fish-hook, a line connected therewith, and fastening means on the spoon for detachably fixing the hook to the spoon in a rigid position.

2. A trolling-spoon having fastening devices on its face adapted to fix a fish-hook to the spoon in a rigid position and provided with means for attaching a line, in combination with a fish-hook having a shank fitted to the fastening devices on the spoon and detachable therefrom under a strain, and means for connecting the hook with the spoon whereby the hook remains connected with the line after it becomes detached from the fastening devices.

3. The combination of a trolling-spoon, a hook, means for detachably fixing the hook on the spoon, means connecting the hook and the spoon permanently together, and means for attaching the spoon to a line.

In testimony whereof I have hereunto set my name to this specification in the presence of two subscribing witnesses.

SAMUEL E. KNOWLES.

Witnesses:
M. REGNER,
EDWARD E. OSBORN.